INVENTOR.
John C. Rentz
BY
ATTORNEY.

INVENTOR.
John C. Rentz
BY John O. Reep
ATTORNEY.

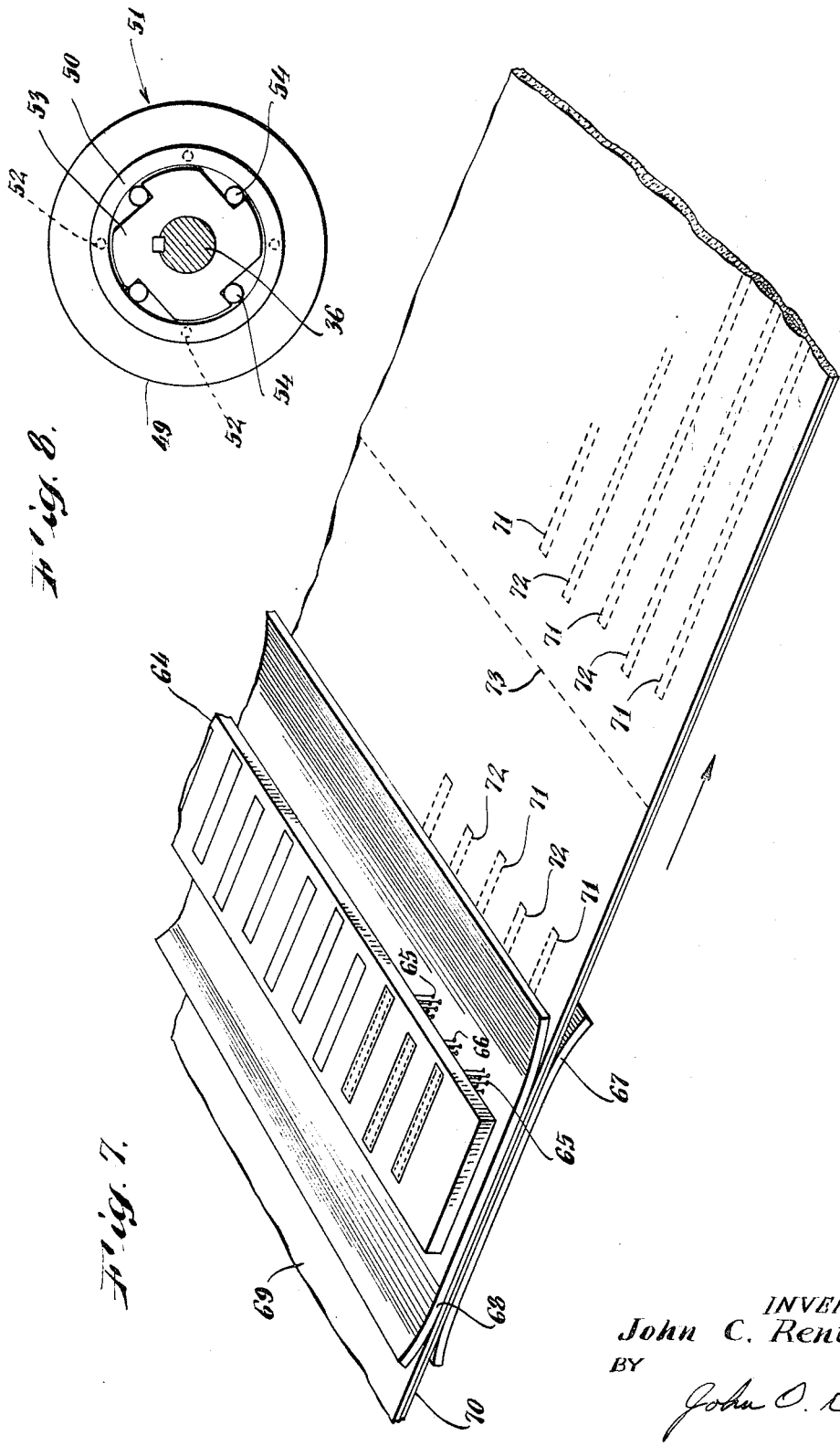

United States Patent Office 3,431,611
Patented Mar. 11, 1969

---

3,431,611
METHOD FOR FORMING NONWOVEN
ELECTRIC BLANKET SHELLS
John C. Rentz, Asheboro, N.C., assignor to General
Electric Company, a corporation of New York
Filed Sept. 16, 1966, Ser. No. 580,051
U.S. Cl. 28—72.2                    7 Claims
Int. Cl. D04h 18/00

ABSTRACT OF THE DISCLOSURE

A method of joining two webs or layers of fabric to produce a shell with spaced channels to subsequently receive heating wires or similar thermal transfer means including the steps of: (1) positioning the layers in face to face relationship; (2) reciprocating needles through both layers along spaced bands to join the layers while defining open channels between the bands; and (3) removing laminated layers from the reciprocating needles.

---

The present invention relates methods and apparatus for forming fabric shells for use in bedcovers.

In the manufacture of thermal bedcovers, it is desirable to provide spaced parallel channels between two layers of fabric making up the bedcover. Shell is a term used in the trade to describe this double ply bedcover construction having the aforementioned channels. Heating wire or other thermal transfer conduit means is introduced through the channels in a serpentine fashion, and parallel spaced lines or bands connecting the layers and defining these channels provide dividers which separate adjacent runs of the heating wire from each other. In the past, shells have been formed from woven materials by using a loom action which weaves the warp threads of one ply into the other ply along spaced lines to define parallel channels between the plies as the two plies are formed. Such a construction is described in a U.S. patent to Moberg No. 2,203,918 dated June 11, 1940.

Non-woven fibrous materials offer a wide source from which to select materials, either natural or synthetic, to be used in shells for use in electrically heated bedcovers. Problems are presented, however, when it comes to effectively forming channels between two layers of nonwoven material to accommodate the heating wire. The method described above for forming channels between layers of woven material cannot be used with nonwoven material because nonwoven materials are not formed by weaving warp and weft threads in a pattern; but rather, a nonwoven fibrous web generally is formed of a plurality of relatively short fibers or filaments arranged together in a random manner and adjacent fibers in the web are interlocked with each other so that the web is self-sustaining.

It is therefore an object of the present invention to provide a method used in making shells from layers of nonwoven fibrous material for use in bedcovers wherein the layers are effectively needle-laminated together along spaced parallel bands having adjacent ends staggered with respect to each other and defining channels between the layers to permit a thermal transfer conduit to be easily inserted through the channels.

Another object is to provide a method of making shells from webs of nonwoven fibrous material for use in bedcovers wherein the webs are led from supply rolls, and channel-defining bands are sequentially formed on the webs by needle-laminating to connect the webs along bands transverse to the flow of the webs.

A still further object is to provide a method of making shells of the character indicated wherein channel-defining bands are formed by needle-laminating webs together parallel to the direction of the flow of moving webs.

Another object is to provide a needle board structure which is particularly adapted to be used in forming shells from nonwoven fibrous layers.

In carrying out the objects of my invention in accordance with one aspect thereof, two layers of nonwoven fibrous material are positioned adjacent a needle-laminating means in face to face relationship. The needle laminating means includes groups of needles arranged in a manner such that the layers may be needle-laminated together along a plurality of spaced bands having adjacent ends staggered with respect to each other and defining open parallel channels between the bands of sufficient width to accommodate a thermal transfer conduit.

In accordance with another aspect, opposite layers of nonwoven fibrous material are advanced through a needle loom by incremental relatively short steps between each insertion of the needles of a needle board while spaced parallel bands are being formed by needle-lamination to cause each needle to enter each band a plurality of times to increase the needling density, and the layers are advanced a relatively long distance between each band forming operation to provide for the formation of open channels between the bands.

Further objects and advantages of my invention may best be understood by reference to the following description taken in connection with the accompanying drawings in which:

FIG. 7 is a perspective view of another embodiment of apparatus used in a method of this invention; and FIG. 8 is a sectional view along line 8—8 of FIG. 5.

Figure 1:
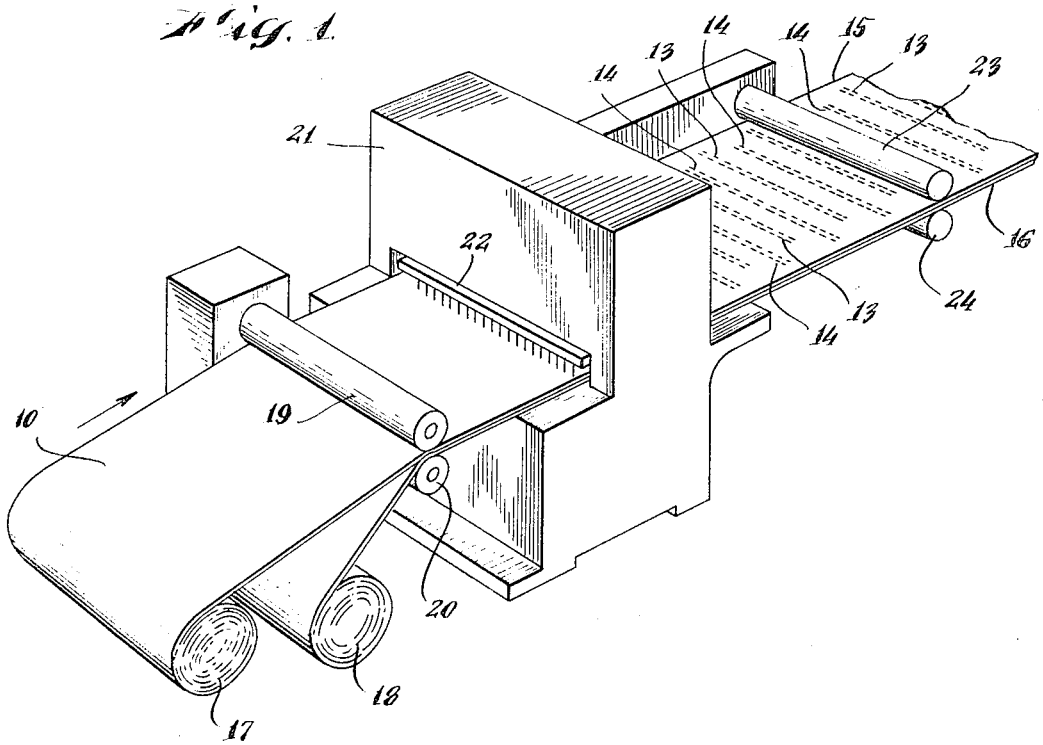
FIG. 1 is a perspective view of a shell forming apparatus used in the present invention.
Figure 2:
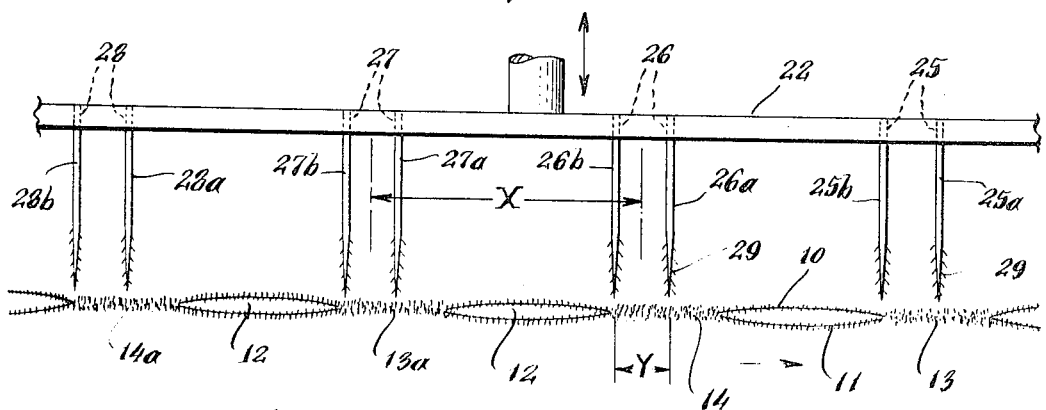
FIG. 2 is a schematic drawing illustrating the relative positions of a needle board and fabric layers just after completing one band-forming operation.
Figure 3:
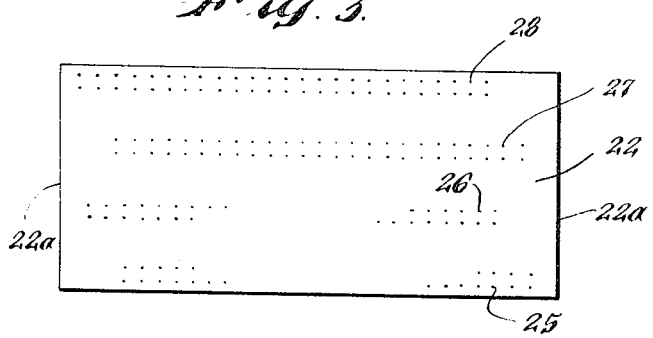
FIG. 3 is a plan view of the bottom of a needle board of this invention.

With reference to FIGS. 1 and 2 of the drawing, there is illustrated a stage of fabrication of shells, the shells being formed from superposed webs or layers 10 and 11 of nonwoven fibrous material. The manufacture of fabric webs from nonwoven material, both natural and synthetic, is well known in the art, and my invention is not limited to any specific material. By way of example, fibers such as cotton, rayon, polyester, acrylic or combinations of fibers of different materials may be used. Each layer is made up of a plurality of closely arranged individual crimped fibers which have a degree of interlock with each other to make each layer self-sustaining. In order to provide a plurality of spaced, open parallel channels 12 between the layers 10 and 11, the layers are needle-laminated together along spaced groups of bands 13 and 14 which extend generally perpendicular to opposite common edges 15 and 16 of the layers forming the shell. The term needle-laminating when used herein, and in the appended claims, refers to inserting a needle or groups of needles through both layers of material perpendicular to the plane of the layers. The needles may have barbs along the shank which carry some of the fibers of one layer into the other layer thereby causing the two layers to be joined together through the medium of the fibers which extend into and between both of the layers. As seen clearly at FIG. 1, the bands are preferably arranged in a manner such that the first group of bands 13 alternate with the second group of bands 14, and the first bands 13 are spaced a greater distance from a common edge 16 of the layers than the ends of the second bands 14. The opposite ends of the bands are also staggered with respect to each other along the edge 15. The staggered or offset pattern for the bands is useful to assure that adjacent runs of heater wire, which is ultimately inserted through the channels, do not contact each other.

One manner of inserting heater wire through the channels is by carrying the wire on a flat elongated bar, commonly called a shuttle (not shown), which is manually inserted back and forth through the channels 12. This bar is generally on the order of .625 inch wide, and so to assure sufficient clearance in the channels to accommodate the bar, the channels are preferably made at least one and one-fourth inches wide. The outer dimensions of the shell will depend on the size of the desired electric bedcover which is to ultimately be formed from the shell. It is to be understood that once the heater wire and appropriate temperature control devices and terminal blocks have been inserted in the shell, the edges of the shell may be bound together to provide a finished electrically heated bedcover.

In one method of making the shell just described, and with reference to FIGS. 1 through 4, webs 10 and 11 of nonwoven fibrous material are fed from respective supply rolls 17 and 18 between the nip of guide rolls 19 and 20 to a needle-laminating loom 21. The loom includes a needle board 22 which reciprocates vertically to needle-laminate the webs together along spaced groups of bands 13 and 14 separated by channels 12 in a manner to be described hereinafter in more detail. From the loom, the laminated webs pass between the nip of rolls 23 and 24. Actually, it is the roll 24 which is driven at a desired predetermined rate of speed which serves to advance the webs through the loom, and the roll 23 functions as a hold-down mechanism keeping the web 11 in contact with the roll 24. The laminated webs may then be wound and stored on a roll to be later transversely severed to form shells of any desired length, or else the transverse severing to form individual shells may be accomplished by appropriate severing mechanism acting on the webs after they emerge from rolls 23 and 24.

The needle board 22 which I have preferred to illustrate includes four groups 25, 26, 27 and 28 of needles. Longitudinal center lines through adjacent groups are separated from each other equal distances of two inches indicated by the letter X in the drawing. Each group of needles comprises two parallel rows identified in the drawing with the appropriate group numeral plus the subscripts a and b. The rows in each group are separated from each other a distance of approximately .375 inch indicated by the letter Y in the drawing. This distance Y may therefore be considered to be the width of each group of needles. In order to form the staggered bands in the web referred to above, the ends of the groups 25 and 27 are staggered with respect to the ends of groups 26 and 28. By staggered (see FIG. 3) it is meant that one end of the groups 26 and 28 is located closer to one edge 22a of the needle board 22 than an adjacent end of the groups 25 and 27 with respect to the same edge. The opposite end of groups 25 and 27 is closer to the edge 22b of the needle board than the end of groups 26 and 28. Each needle is secured to the needle board at one end thereof, and the opposite end of each needle includes barbs 29 which are inserted into both webs in the needle-laminating operation.

As will be pointed out hereinafter, the groups 25 and 27 each perform a needling operation on each of the bands 13, and the groups 26 and 28 each perform a needling operation on each of the bands 14. To reduce the possibility that a needle in group 25 will enter the web at the same place that a needle in group 27 has already entered, or that a needle in group 26 will enter where a needle in group 28 has entered, it may be desirable to space the needles in a somewhat random manner from each other along the length of the rows.

FIG. 2 illustrates the position of the needles relative to the webs, after the groups 25 and 27 of needles have formed bands 13 and 13a, and the groups 26 and 28 of needles have formed bands 14 and 14a. The bands are approximately 0.75 inch wide, and the channels 12 are approximately 1.25 inches wide. Now, the needles are held in an inoperative position relative to the webs 10 and 11 until the webs have moved to the right a sufficient distance where the row 25a is aligned with the right hand edge (as viewed in the drawing) of the band 13a, and the row 26a is aligned with the right hand edge of band 14a. At this point, the groups 27 and 28 will be in position to form new bands, while the groups 25 and 26 are in position to perform a second needle-laminating operation on bands 13a and 14a. Now, the needles are again caused to rapidly move into and out of the webs while the webs are moving in the direction of the horizontal arrow until the needles and webs reach a relative position similar to the position of FIG. 2, and a cycle is thereby completed.

It is therefore clear that each cycle includes a first period while the needles are actively performing a needle-laminating or band-forming operation, and a second period while the needles are not permitted to enter the webs so as to form the channels 12. During the first period, referred to as the needle laminating operation, needles are caused to be inserted a number of times, with the webs moving only a very short step or distance, say on the order of .025 inch between each insertion of the needles. The total distance that the webs move during the second period of time may be computed by a formula, and this distance is equal to the width of a band plus twice the width of a channel plus the width of a group of needles (the distance Y in the drawing). If there were only one row of needles in each group, then the distance Y would be zero, and the same formula for computing the total distance moved in the second period may be used.

The reason for moving the webs this distance in the second period is so that an appropriate group of needles will align with a proper band, and the staggered relationship of the ends of the bands will be preserved. This relationship may be maintained, of course, with the needle board illustrated by advancing the webs a sufficient distance during this second period so that an entire new group of bands are formed by a subsequent needle-laminating operation; and, in this instance, each band will only have one needle-laminating operation performed thereon. Furthermore, instead of four groups of needles, the board may have two groups, six groups, or even more groups of an even number depending on the needle density which is desired in the bands and the capability of the particular needle loom chosen for use. The distance that the web travels during the second period may be predetermined depending on the number of groups of needles and on the needling density desired, the important thing being that the advancements are such that the staggered relationship at the webs of the bands be maintained.

The needle density or number of needle penetrations per square inch is influenced by a number of factors. Among the factors are the number and spacing of needles in the needle board, the rate of advancement of the webs as they are being needle laminated and the number of separate needle-laminating opeartions performed on each band; which, in the present example, is two. I have found that it is desirable to so choose the above factors or design parameters, so that there is a needling density of at least 600 penetrations per square inch in the bands.

Figure 4:
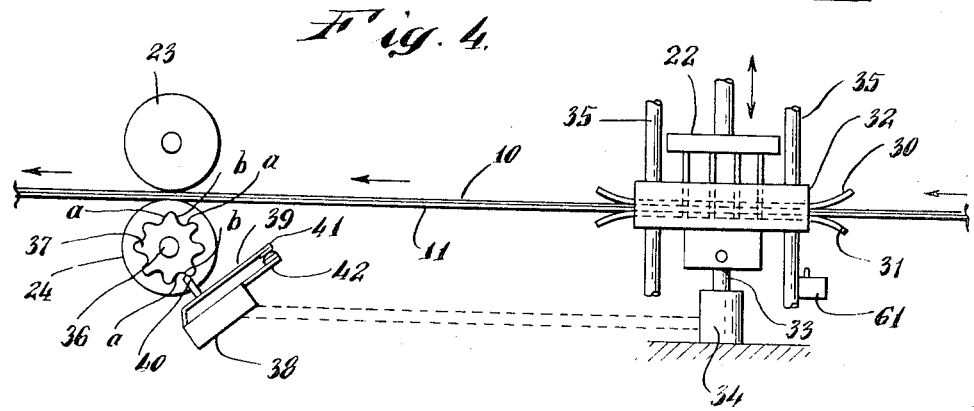
FIG. 4 is a diagrammatic front elevation illustrating in greater detail certain of the apparatus of FIG. 1.

In the discussion above, reference has been made to a first period of time (when needle-laminating is taking place) and a second period of time (when the needles do not enter the web). Reference may now be made to FIGURE 4 in order to understand one apparatus and method that may be used to automatically properly position the webs relative to the needles to obtain the desired function during the respective periods. At FIGURE 4, the webs are seen to pass between a pair of stripper plates 30 and 31 mounted beneath the needle board 22, and the plates have apertures aligned with the needles so that the needles may pass through both plates. The plates are connected to each other by a frame member 32, and the assembly including the plates and frame are connetced to a rod 33 forming the armature or core of an electro-magnetic solenoid 34. The frame and plates are mounted for movement in unison with respect to stationary vertical guide posts 35. A shaft 36 for the advancing roll 24 has a programming cam 37 securely affixed thereto for rotation with the shaft. A sensing switch 38 includes a switch actuating follower arm 39 which includes an abutment 40 continually biased against the cam surface. The follower arm 39 is resilient and carries an electrical contact 41 into or out of engagement with a fixed electrical contact 42 depending on the position which the abutment 40 of the follower arm occupies on the cam surface. I have identified points $a$ and $b$ on several of the lobes of the cam surface, and it is to be understood that similar points exist on each of the cam lobes. Thus, when the shaft 36 is turning in the direction of the arrow, the contacts 41 and 42 will be engaged with each other when the follower arm is in contact with the cam surface near the top of the lobe between points $a$ and $b$. When, however, the follower arm is in contact with the cam in the valley between point $b$ of one lobe an point $a$ of the next adjacent lobe, the contacts 41 and 42 will not be engaged. The contacts complete an electrical circuit through the solenoid 34 in a manner such that when the contacts are engaged, the stripper plates 30 and 31 are raised to position where the reciprocating needles may penetrate the webs 10 and 11, and when the contacts are disengaged the stripper plate moves downwardly and carries the webs with it so that even though the needles continue to reciprocate they will not enter either of the webs. Thus, the period that the contacts are engaged corresponds to the first period when the bands are being formed, and the period when the contacts are disengaged corresponds to the second period when the needles do not penetrate the web so as to provide the channels. I have found it desirable to provide a stepping motion to the advancing roll so that the webs are advanced a series of relatively short incremented steps at a first rate of speed while the bands are being formed, and the webs are advanced a relatively long distance at a second faster rate of speed than the first corresponding to the period of time when the needles do not penetrate the webs and the channels are being formed. It is advantageous to interrelate the driving means for the needle board with the driving means for stepping the advancing roll so that movement is imparted to the webs only when the needles are in the upper portion of their reciprocating cycle. One means of accomplishing this stepping motion to the advancing roll and interrelating this stepping motion to the driving means for the needle board may be better understood by referring to FIGS. 5, 6 and 8.

Figure 5:
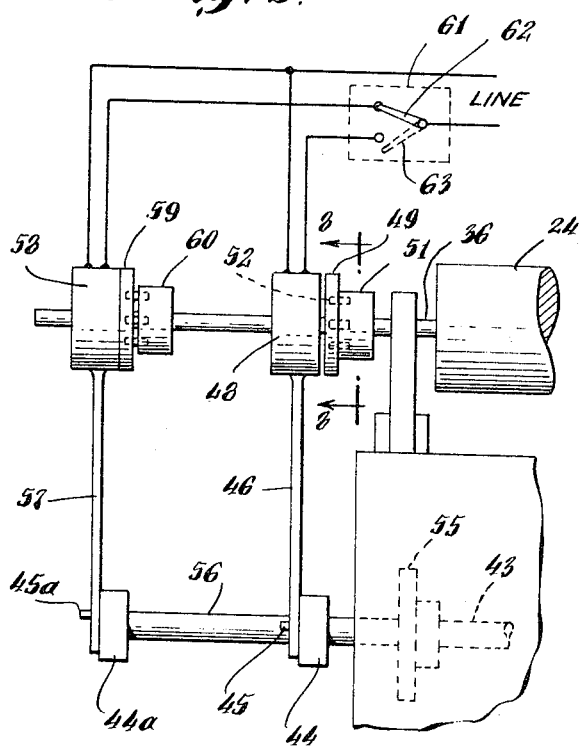
FIG. 5 is a diagrammatic side elevation of apparatus used to provide a stepping motion to the advancing roller.
Figure 6:
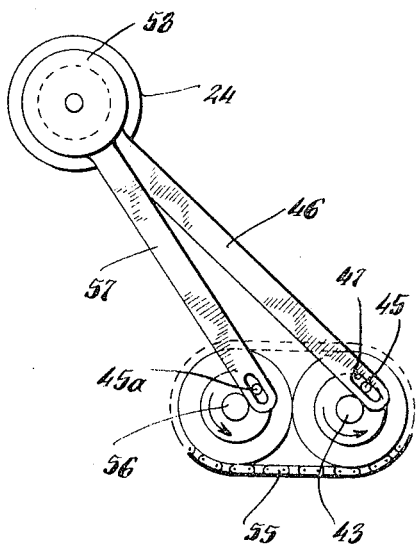
FIG. 6 is a diagrammatic rear elevation of the apparatus of FIG. 5.

With reference to FIGS. 5, 6 and 8 a needle loom drive shaft 43 rotates and, through an appropriate crank mechanism not shown, imparts a reciprocating motion to a needle board. A hub 44 is secured on the end of the shaft 43, and the hub has a pin 45 extending therefrom. A first crank arm 46 is provided at one end with a slot 47 which is positioned around the pin 45, and the other end of the crank arm is secured to an electromagnetic clutch member 48. The clutch member is of itself free to oscillate relative to shaft 36 and it only becomes coupled to the shaft 36 when electric current is supplied to this clutch member. The shaft 36 drives the web advancing roll 24. A clutch plate 49 is attached to the outer race 50 of a ratchet assembly 51 through the medium of pins 52. An inner race 53 of the ratchet assembly is securely fixed to the shaft 36. The clutch plate 49 is free to move on the pins 52 axially with respect to the shaft 36 a short distance toward the magnetic clutch member 48; however, any oscillating motion of the clutch plate 49 is transmitted to the outer race 50. In other words, when electrical current is supplied to the member 48 through switch 61, the clutch plate 49 is attracted thereto so that the clutch plate 49 and the outer race 50 now oscillate together with the clutch member 48. This oscillaing motion of the outer race is transmitted through the medium of rollers 54 to the inner race 53 (see FIGURE 8) to provide a unidirectional stepping motion to the inner race 53 shaft 36 and web advancing roll 24. When, however, electrical current is not being supplied to the clutch member 48, then this member is no longer magnetically coupled to the clutch plate 49 and so the member 48 oscillates independently of the clutch plate 49. A sprocket and chain assembly 55 is positioned so as to translate motion of the first shaft 43 to a second shaft 56. The second shaft 56 is linked to the advancing roll drive shaft 36 through a crank arm 57, clutch member 58, clutch plate 59, and ratchet assembly 60 in a manner similar to that just described in connection with the first shaft 43.

Summarizing, then, the relationship of clutch members 48 and 58 to the web advancing shaft 36, it is first to be undertsood that continuously rotating shaft 43 supplies a continuous oscillating motion to each of the clutch members 48 and 58 through their respective crank arms 46 and 57. One or the other of the members 48 and 58 is used to drive the shaft 36 in a unidirectional stepping motion through a clutch plate and ratchet assembly, and which of the members 48 and 58 is doing this driving will depend on which one has electricity supplied thereto. Thus, when switch 61 is in the solid line position of FIG. 5, the clutch 58 is coupled to plate 59 and ratchet 60 to advance the shaft 36 a relatively long distance for each oscillation of the number 58. When the switch 61 is in the dotted line position, the member 48 is coupled to the shaft to drive the shaft a relatively short distance for each oscillation of the member 48. It is the fact that the arm 46 is longer than the arm 57 and also the fact that the pin 45 is spaced closer to the axis of the shaft 43 than the pin 45a is spaced from the axis of shaft 56 that causes the relatively short distance movement of member 48, and the relatively long distance movement of member 58.

It is to be understood that the structural assembly illustrated at FIGS. 5, 6 and 8 may be used in connection with the mechanism schematically illustrated at FIG. 4 in which instance the switch 61 is mounted on a guide 35 to be actuated by the stripper plate 31. Thus, when the stripper plate 31 is lowered, the switch 61 is in the position illustrated by the solid line in the drawing (FIG. 5) and the clutch 58 will be advancing the roll 24 a relatively long distance corresponding to the second period of time in the cycle referred to above. When the switch is in a position connecting switch arm 62 of switch 61 to a contact 63, the magnetic clutch 48 is advancing the roll short increments of distance corresponding to the first period of time in the cycle referred to above.

Assuming that the needle board 22 is just completing its last reciprocal movement in one cycle to form one group of bands, the operation of the structure of FIGS. 4 and 5 is as follows: As soon as the needle board 22 is raised, the programming cam 37 will have moved so that the arm 39 is in a position which deactivates the solenoid 34 through the switch 38. The stripper plate assembly 30 and 31 then moves downwardly carrying the webs 10 and 11 with it so that the continually reciprocating needles will no longer penetrate the webs. At this point, the switch 61 has its movable contact arm 62 moved to the solid line position shown in FIG. 5 so that the clutch 58 is in engagement with the shaft 36 through ratchet assembly 60, and the clutch 48 is out of engagement with the shaft 36. Rotation of the shaft 36 is now imparted in a unidirectional stepping manner to the advancing roll 24 through the shaft 36 until the abutment 40 reaches a point $a$ on the next adjacent lobe of the programming cam 37. The distance the cam 37 has moved between the points $b$ and $a$ corresponds to the required distance between cycles of the needle board. In other words, movement of the cam between points b and a in the direction of the arrow corresponds to a distance of movement of the web by the advancing roller of a width of a band plus twice the width of a channel plus the width of a group of needles. When the abutment 40 on the switch 38 reaches point a on the cam, the solenoid 34 will again move the stripper plate assembly upwardly. In the upper portion of the stripper plate assembly, the switch 61 is in the dotted line position shown in FIG. 5; consequently, the crank arm 46 is now linked to the shaft 36 to move the shaft unidirectionally through a series of relatively short incremental steps while another group of bands are formed in the webs by reciprocation of the needle board 22.

Reference may now be made to FIG. 7 in order to understand another method of forming a shell. A needle board 64 has a plurality of needles secured thereto, and the needles are arranged in spaced alternating groups 65 and 66. The ends of adjacent groups of needles are offset or staggered with respect to each other. A supporting base or stripper plate 67 and 68 are provided with a plurality of apertures in alignment with the needles. Two webs 69 and 70 of non-woven fibrous material are led between the stripper plates underneath the needles. The needle board 64 is then caused to reciprocate so as to insert the needles through both of the webs and needle-laminate the two webs together along spaced parallel bands 71 and 72 while the webs continue to move in the direction of the arrow. Reciprocation of the boards is continued until the desired length of bands have been formed. Then, the needle board is held in an inoperative position relative to the webs until the webs have moved a predetermined distance to define an unlaminated area. The shells are sequentially separated from each other by severing the webs transversely along a line 73 through this unlaminated area. It is to be understood that the structure of FIG. 7 may use advancing means similar to that illustrated at FIG. 4, except that a different programming cam suitable for appropriately advancing the webs appropriate distances between operative and inoperative positions of the needles will be used.

After the webs have been needle-laminated, it may be desirable to subject the shells to a napping operation to restore a uniform appearance to the external surfaces of the shell.

While the present invention thas been described with reference to particular embodiments thereof, it is to be understood that numerous modifications may be made by those skilled in the art without actually departing from the invention. It is, therefore, the aim of the appended claims to cover all such equivalent variations as come within the true spirit and scope of the foregoing disclosure.

What I claim as new and desire to secure by Letters Patent of the United States is:

1. In a method of producing a fabric shell from layers of nonwoven fibrous material, the steps which include:
    (a) positioning first and second layers of nonwoven fibrous material in face to face relationship adjacent a needle-laminating means;
    (b) forming spaced, open, parallel channels between the layers by needle-laminating the layesr together along alternating first and second groups of bands, the ends of adjacent bands being staggered with respect to each other; and
    (c) removing the laminated layers from their position adjacent the needle-laminating means.

2. The method of claim 1 wherein a plurality of bands comprising at least one of the bands of both said first and second groups are needle-laminated simultaneously.

3. In a method of producing a fabric shell from webs of a nonwoven fibrous material, the steps which include:
    (a) leading first and second webs to a position adjacent a row of needles extending transverse to the flow of the webs;
    (b) performing in sequence a plurality of needle-laminating operations on the webs to join the webs along substantially equally spaced parallel bands defining a plurality of open channels between the bands, each of said opeartions including a plurality of needle-laminating steps and the webs being advanced a relatively short distance between each step to cause each needle to be inserted in each band a plurality of times, and said webs being advanced a relatively long distance between operations to provide for the formation of the channels; and
    (c) removing the laminated webs from their position adjacent the needles.

4. In a method of producing a fabric shell from webs of nonwoven fibrous material, the steps which include:
    (a) leading first and second webs from respective supply rolls to a position adjacent a plurality of spaced alternating first and second groups of needles having adjacent ends staggered with respect to each other for forming spaced parallel bands in lines transverse to the direction of the movement of the webs;
    (b) performing in sequence a plurality of needle-laminating operations on the webs to join the webs together along substantially equally spaced parallel bands defining a plurality of open channels between the bands;
    (c) advancing the webs between each needle-laminating operation a total predetermined distance at least equal to the width of band plus twice the width of a channel to maintain a band pattern with alternating staggered ends; and
    adjacent the needles.
    (d) removing the laminated webs from their position adjacent the needles.

5. The method of claim 4 wherein the webs are advanced between each needle-laminating operation a total distance equal to the width of a band plus twice the width of a channel plus the width of a group of needles.

6. The method of claim 4 wherein each needle-laminating operation includes a plurality of needle-laminating steps and the webs are advanced a short distance between each step.

7. A method of producing fabric shell for use in a thermal bedcover, from webs of nonwoven fibrous material which comprises:
    (a) leading first and second webs from respective supply rolls to a position between a supporting base and a plurality of needles arranged in spaced groups, each of said groups extending parallel to the direction of the fiow of the webs:
    (b) needle-laminating said webs together along spaced alternating bands having adjacent ends staggered with respect to each other to define a plurality of open channels of sufficient width to received a thermal transfer conduit between the bands;
    (c) maintaining said needles in inoperative position relative to said webs after a required band length for one bedcover shell has been formed to provide an unlaminated area between the ends of one group of bands formed in said one shell and the ends of another group of bands formed in the next successive shell; and
    (d) transversely severing said web in said unlaminated area and removing said one shell from the web along a line spaced from the ends of the bands.

References Cited

UNITED STATES PATENTS

| | | | |
|---|---|---|---|
| 2,036,766 | 4/1936 | McDermott | 28—4 |
| 2,132,530 | 10/1938 | Greiser | 28—4 |
| 3,241,214 | 3/1966 | Smith et al. | 28—72.2 |
| 3,243,861 | 4/1966 | Kumin et al. | 28—72.2 X |
| 2,203,918 | 6/1940 | Moberg. | |

LOUIS K. RIMRODT, *Primary Examiner.*